June 7, 1966 A. M. KAWALEK ETAL 3,255,414
MODULATION-DEMODULATION TUNING CONTROL SYSTEM USING PLURAL
WINDING TRANSFORMER AND PHASE SENSITIVE SERVO LOOP
Filed Jan. 21, 1963

INVENTORS
ANTHONY M. KAWALEK
JOHN M. TEWKSBURY
BY
Killman, Smith & Lamb
ATTORNEYS United States Patent Office 3,255,414
Patented June 7, 1966

3,255,414

MODULATION-DEMODULATION TUNING CONTROL SYSTEM USING PLURAL WINDING TRANSFORMER AND PHASE SENSITIVE SERVO LOOP

Anthony M. Kawalek, Baltimore, and John M. Tewksbury, Lutherville, Md., assignors to The Bendix Corporation, Towson, Md., a corporation of Delaware Filed Jan. 21, 1963, Ser. No. 252,734
4 Claims. (Cl. 325—173)

This invention relates to radio transmitting and receiving equipment and more particularly to means for tuning the power output stage of radio transmitters.

Radio transmitting equipment of the type usually found on commercial airliners, military aircraft, naval installations, etc., must be capable of very accurate tuning. Because of this requirement, it has been common for the frequencies in low power stages of such equipment to be crystal controlled. Maintaining this precision of control in succeeding high power stages, however, has proved to be difficult. The final output stage, which may carry many watts of power, must be tuned just as precisely on frequency as the stages operating in the milliwatt range. Because of this, typical prior art transmitters have a closed loop servo system to assure accurate tuning including a reversible servo motor which responds to a signal representing frequency error to drive several variable condenser plates in a number of simultaneously tracked stages. The necessary mounting hardware, bearings, shafts, etc. which such structure requires must also be included. Such assemblies are made to close tolerances and are expensive to produce. They are also comparatively large and heavy and contribute considerable weight which is undesirable in airborne equipment. This mechanical equipment has also been found to contribute more than a proportionate amount to the down time and maintenance expense required to keep the equipment in working order. Consequently, it has been desired to eliminate such mechanical moving parts insofar as possible consistent with satisfactory operation.

One technique which has been attempted to accomplish this tuning without the use of mechanical gear involves utilizing the fact that the voltages on the grid and anode of the transmitter output tube are exactly 180° out of phase when the anode circuit is exactly tuned to the frequency of the input signal on the grid. These two voltages can then be sampled and compared in a phase detector, the error voltage being produced when the desired 180° phase relation is absent. This system, as described, has two primary disadvantages; one, that it creates a path for regenerative feedback which may be difficult to cope with; and another, that it is only useful at relatively low frequencies because of the limitations of currently available phase discriminator circuits. Efforts to use this technique in the 100 mc. range have not been successful.

Although solid state devices or ferromagnetic devices would seem to be logical choices for components to replace the mechanical structure currently employed, they have some significant disadvantages of their own. While a variable condenser maintains its capacitance value very well, solid state and ferromagnetic devices are subject to drifting with temperature changes and ageing effects. We have found that these disadvantages can be largely overcome by using a closed loop servo system with a phase discriminator operative at audio frequencies. In our system, the radio frequency signal, which may be of the order of 120 mc., is modulated with a signal from an audio oscillator, the radio frequency signal is detected and the resulting signal is compared with the audio oscillator signal in the phase discriminator. When the radio frequency circuit in the anode circuit of the output tube is tuned below the frequency of the input signal on the grid, the modulating signal has inparted to it a certain phase shift. When the resonant circuit is operating tuned above the input frequency, a phase shift in the opposite direction occurs, and this difference is translated into a polarity difference by the phase discriminator. This resulting direct current signal is then used to cause a change in the reactance of the resonant circuit. When the resonant circuit is on frequency, the modulation signal is cancelled out in the phase discriminator and no error signal is supplied. Although our system is discussed herein in connection with a vacuum tube output stage, it is equally applicable to transistor output stages.

Thus the frequency corrections are accomplished without any moving parts whatever. It has been demonstrated that, rather than requiring six or seven seconds to tune the circuit as was typical with prior art mechanical means, our system can tune a previously untuned circuit in approximately ten milliseconds. An additional advantage is that the system compensates automatically for undesirable reactance in the antenna circuit which tends to detune the output stage. Thus the antenna design need not be so critical and more efficient coupling can be used between the output stage and the antenna circuit. It is an object of the present invention, therefore, to provide a tuning system for tuned circuits carrying substantial amounts of power which is completely electrical and requires no mechanical moving parts.

It is another object of the present invention to provide a tuning system for tuned circuits carrying substantial power which is considerably more reliable and trouble free than systems presently in use.

It is another object to provide a tuning system for tuned circuits carrying substantial power which is considerably faster in operation than the mechanical systems presently in use.

It is a further object of the present invention to provide a tuning system for tuned circuits carrying substantial power in which inaccuracies due to temperature and ageing effects and other factors affecting deterioration or variation of components, are largely compensated for.

It is a further object of the present invention to provide a tuning system for tuned circuits carrying substantial power which meets the above objects and which is smaller, lighter and less expensive to produce than the typical prior art systems.

Other objects and advantages will appear from the following specification taken in connection with the accompanying drawings, in which.

Figure 3:
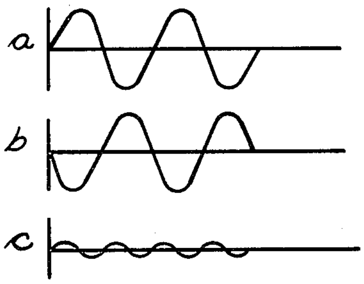

FIGS. 3*a*, 3*b* and 3*c* show the different phase relationships which appear in the alternating current component supplied to the phase detector of FIG. 1 for frequency error of the output resonant circuit below the frequency of the input to the output tube, above this frequency, and on frequency, respectively.

Figure 1:
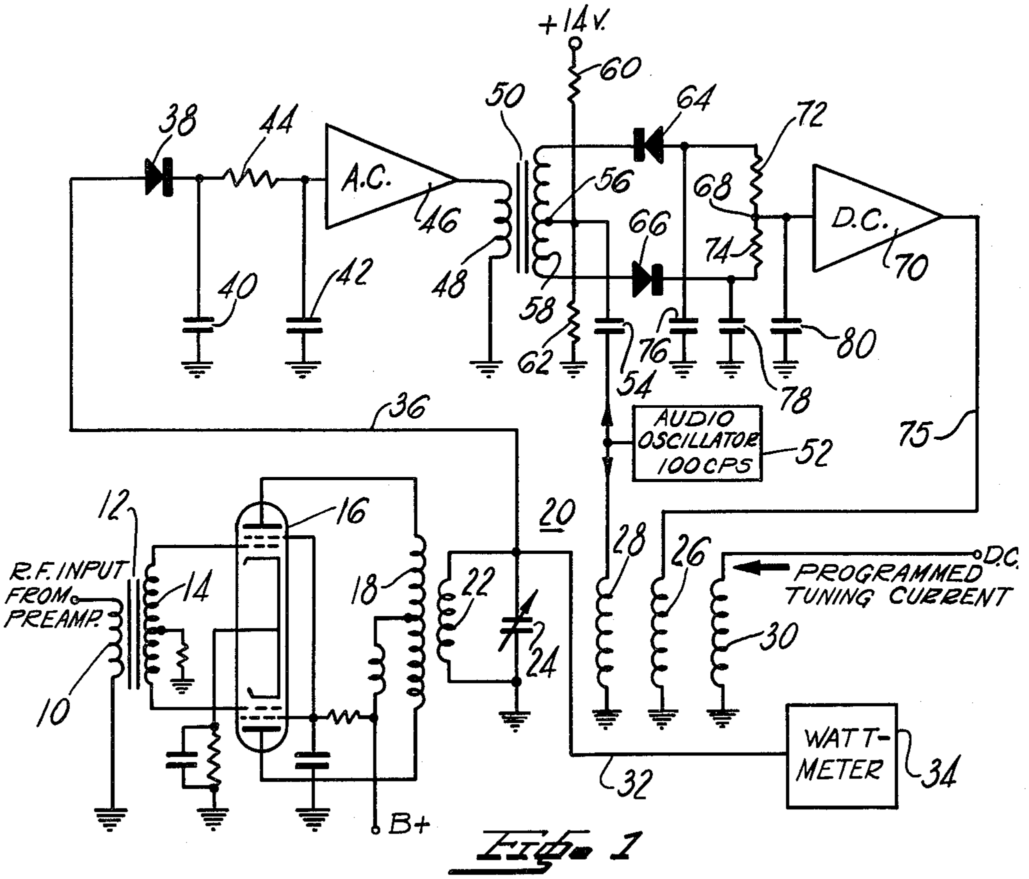
FIG. 1 is a schematic diagram of a tuning system incorporating our invention.

Referring now to FIG. 1, this figure is a schematic diagram showing an output stage of a typical transmitter together with a tuning system incorporating our invention. The radio frequency input from a preamplifier (not shown) is supplied to the primary winding 10 of a coupling transformer 12, which has a center tapped secondary winding 14 in order to provide the input of a push-pull amplifier stage including a dual tetrode 16. The output from tube 16 is supplied to a center tapped winding 18, which forms part of a controllable inductor shown generally at 20. The controllable inductor shown herein consists of the winding 18 and a secondary winding 22 forming part of a resonant circuit consisting of itself and a manually variable capacitor 24. Both of windings 18 and 22 are wound on a ferrite core. Inductively coupled with the ferrite core is an additional iron core including a plurality of control windings 26, 28 and 30. Such controllable inductors are available from Trak Electronics Division of CGS Laboratories, Incorporated and are sold under the trade name "Increductor." The output from the resonant circuit consisting of winding 22 and capacitor 24 is connected through a wire 32 to a watt meter 34. Wire 32 might also be connected through suitable coupling means to an antenna. Part of the output of the resonant circuit is connected through a wire 36 to a diode 38 which serves as a radio frequency detector. The output from the diode 38 is filtered by means of an R–C circuit consisting of capacitators 40 and 42 and a resistor 44 before being supplied to the input of an amplifier 46. The output amplifier 46 is supplied to the primary winding 48 of a coupling transformer shown at 50.

An audio oscillator 52 supplies a uniform low frequency signal (100 c.p.s.) to one of the control windings 28 of the controllable inductor. The same signal is also coupled through a capacitor 54 to the center tap 56 of the secondary winding 58 forming part of transformer 50. Center tap 56 is connected through a resistor 60 to a direct current voltage source (14 v.) and through a resistor 62 of equal value to ground. One end of secondary winding 58 is connected to a diode 64 and its opposite end is connected to a diode 66, oppositely poled. These two diodes are connected through resistors 72 and 74, respectively, to a common terminal 68 at the input to a direct current amplifier 70. Diode 64 is connected to ground through a by-pass capacitor 76 and diode 66 is connected to ground through a by-pass capacitor 78 of substantially equal value. An additional capacitor 80 of large value effectively removes any remaining A.C. component from the input to the direct current amplifier 70. The output of amplifier 70 is connected through a wire 75 to one of the control windings 26 of the controllable inductor 20. The winding 30 is connected to a direct current source and provides a programmed tuning current to the controllable inductor 20 for the purpose of establishing an approximate value of resonant frequency for the resonant circuit including winding 22 and capacitor 24. As such, it operates primarily as a bias winding.

Figure 2:
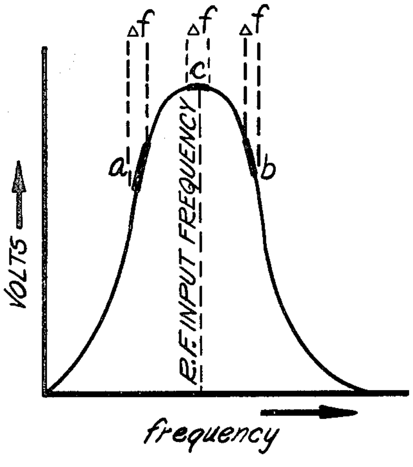
FIG. 2 is a graph showing the manner in which a modulation voltage on the carrier varies with frequency in the region where the tuned circuit in the anode circuit of the output tube is near the frequency of the input signal on the grid.

In operation the transmitter output tube 16 supplies a radio frequency signal to the winding 18 and this signal is coupled to the resonant circuit consisting of winding 22 and adjustable capacitor 24, from whence it is supplied to the watt meter 34 or to an antenna. The effective reactance of winding 22 is varied by means of current flowing in any of the control windings 26, 28 or 30. In order to avoid making very large adjustments in the tuned frequency by means of the closed-loop tuning means, a direct current signal is supplied to winding 30 which is of such value as to bring the resonant circuit close to the desired frequency. In this manner the operator can place the output circuit in tune within certain prescribed limits immediately. A 100 c.p.s. signal is supplied to winding 28 from the audio oscillator 52 and this signal is induced into the resonant circuit and effectively modulates the radio frequency carrier signal. FIG. 2 is a graph showing the manner in which the amplitude of the modulating voltage varies with frequency around the point of resonance. This characteristic is defined by a roughly bell-shaped curve in which the magnitude of the voltage variation due to the modulating signal ($\Delta f$) is at a maximum for frequencies either lower or somewhat higher than resonance and are at a minimum when the tuned circuit is on resonance. It will be observed that the portions of the curve designated *a* and *b* are substantially equal in amplitude but opposite as to slope, while the portion *c* at the top of the curve has very small amplitude but will change direction with twice the frequency of curves *a* and *b*. This is shown more clearly in FIG. 3 where the curves 3*a* and 3*b* are shown as typical sinusoidal waveforms of approximately equal amplitude but opposite in phase, while curve *c* is a sinusoidal waveform of twice the frequency of curves *a* and *b*, but of much smaller amplitude. Curve C has actually been exaggerated somewhat in amplitude to make it visible on the scale of the graph. In practice, one installation has been designed in which the maximum modulation of the carrier by the audio oscillator signal is approximately 17%, at the 3 db off resonance point, while the modulation appearing at resonance is approximately ½%. Assuming now that the resonant circuit is off frequency in such manner as to produce a modulation similar to that shown in curve *a*, this modulated signal will be supplied through wire 13 to the detector 38 which, in combination with the filter circuit consisting of capacitors 40 and 42 and resistor 44 effectively removes the radio frequency component. The audio frequency component is then supplied to the amplifier 46 where it is amplified and supplied to the winding 48 of transformer 50. The signal appearing in winding 48 is mixed with that from the audio oscillator in the transformer 50. Because of the operation of the diodes 64 and 66, the signal supplied to winding 48 will be either in phase with the half cycle passing diode 64 or in phase with the half cycle passing diode 66. In either case, it will be out of phase with the opposite half cycle and thereby augments one of these signals and opposes the other. As a result a voltage differential occurs across the resistors 72 and 74 and the algebraic sum of these appears at the input to amplifier 70 where it is amplified and supplied to winding 26. The resulting current flow appearing in winding 26 effectively varies the reactance of the winding 22, thereby causing the resonant frequency of the resonant circuit to be varied in the proper direction and by the proper amount to bring it to the desired frequency. When the resonant circuit is on frequency the signal appearing at the input to amplifier 46 is similar to that shown in FIG. 3*c* having comparatively small amplitude and twice the frequency of the error signals. This signal, when amplified and supplied to the phase detector, produces an equal effect on both branches of the phase detector. There is, therefore, no effective voltage differential occurring across resistors 72 and 74 and no input to the direct current amplifier 70. No correction signal then appears on winding 26.

It was previously stated that our system has a particular advantage in that it makes it possible to avoid detuning of the output resonant circuit as a result of reactance in the antenna or load circuit. Changes in the reactance of the antenna circuit, which is coupled to the output resonant circuit, are induced as reactance changes into the resonant circuit. When the resulting frequency change occurs, the input signal to the detector 38 is again modulated as previously described and the system operates to correct the resonant frequency of the output resonant circuit.

While only one embodiment has been shown and described herein, modifications may be made within the scope of the present invention to meet specific requirements. In an over-all transmitting system it is quite possible that it would be desired to provide means for tuning to any of a number of carrier frequencies. To this end, it is apparent that a number of programmed tuning current windings, such as winding 30, might be incorporated into the system in order to provide approximate reference direct current levels. When such a system was switched from one frequency to another, the new frequency would appear at the grid of the ouput tube 16 and would be supplied either to winding 30 or to another winding like winding 30, thereby causing the reactance of winding 22 to approximate that which would give rise to resonance at the new frequency. The system would then proceed to tune itself precisely to the desired new frequency as previously described. Also, although the system shown and described herein is most appropriate for output stages wherein power levels of the order of 25 watts or more must be supplied, it will be apparent to those skilled in the art that, particularly for lower power requirements, a similar system can be arranged in which the direct current error voltage can be supplied to voltage variable capacitance means to correct the resonant frequency of the output circuit rather than to the controlled inductance means.

We claim:

1. A tuning system for radio frequency circuits carrying substantial amounts of power including an amplifying device having a radio frequency input signal and a resonant circuit receiving its energy from said amplifying device, said resonant circuit including capacitance means and current controllable inductance means including a control winding and a modulation winding, an oscillator for generating a low frequency signal and means connecting said low frequency signal to said modulation winding to vary the tuning of said resonant circuit thereby amplitude modulating the radio frequency signal in said circuit, detecting and filtering means connected to receive a portion of the output of said resonant circuit for removing the radio frequency component while preserving the low frequency component of said modulated signal, an amplifier connected to said detecting and filtering means for amplifying said low frequency component, a phase comparing device connected to receive and compare the outputs of said amplifier and said oscillator producing a direct current voltage whose polarity is dependent upon the phase relationship resulting from said comparison, and means connecting said direct current voltage to said control winding such that a reactance change is produced in said resonant circuit which causes said resonant circuit to be turned to the frequency of said radio frequency input signal.

2. A system for tuning a resonant circuit as set forth in claim 1 wherein said current controllable inductance means includes at least one additional control winding for receiving a programmed direct current tuning signal.

3. A system for tuning an output stage of a radio transmitter including an amplifying device to which a radio frequency carrier is supplied, a winding connected to the output element of said amplifying device and a resonant circuit including capacitance means and current controllable inductance means, said inductance means including a power winding inductively related to said first named winding, a modulating winding and a control winding.

an oscillator for generating an audio frequency signal and means connecting said audio frequency signal to said modulating winding thereby amplitude modulating said radio frequency carrier, detecting and filtering means connected to receive a portion of the output of said resonant circuit for removing the radio frequency component while preserving the low frequency component of said modulated signal, an amplifier connected to said detecting and filtering means for amplifying said low frequency component, a phase comparing device connected to receive and compare the outputs of said amplifier and said oscillator producing a direct current voltage whose polarity is dependent upon the phase relationship resulting from said comparison, and means connecting said direct current voltage to said control winding such that the reactance of said controllable inductance means is altered in the proper sense to tune said resonant circuit to the frequency of said radio frequency carrier.

4. A system for tuning a resonant circuit as set forth in claim 3 wherein said current variable inductance means includes at least one additional control winding for receiving a programmed direct current tuning signal.

References Cited by the Examiner

UNITED STATES PATENTS

| | | | |
|---|---|---|---|
| 2,474,354 | 6/1949 | Guanella | 334—13 |
| 2,747,083 | 5/1956 | Guanella | 325—132 |
| 2,996,682 | 8/1961 | Miller | 332—51 |
| 3,099,803 | 7/1963 | Unger | 331—16 |

FOREIGN PATENTS

| | | |
|---|---|---|
| 1,246,110 | 10/1960 | France. |

DAVID G. REDINBAUGH, *Primary Examiner.*

B. V. SAFOUREK, *Examiner.*